United States Patent [19]

Ling

[11] Patent Number: 4,750,650
[45] Date of Patent: Jun. 14, 1988

[54] EXTENDED SURFACE APPARATUS FOR USE IN DISPENSING LIQUIDS

[76] Inventor: Carl P. C. Ling, 473 Beauchamp Road, Maroubra, N.S.W. 2035, Australia

[21] Appl. No.: 741,159

[22] Filed: Jun. 4, 1985

[30] Foreign Application Priority Data

| Jun. 12, 1984 | [AU] | Australia | PG5450 |
| Jun. 20, 1984 | [AU] | Australia | PG5586 |
| Jul. 12, 1984 | [AU] | Australia | PG5964 |
| Sep. 5, 1984 | [AU] | Australia | PG6939 |
| Feb. 27, 1985 | [AU] | Australia | PG9475 |

[51] Int. Cl.$^4$ .................................................. B22D 41/00
[52] U.S. Cl. ........................................ 222/632; 222/207; 239/370; 604/296
[58] Field of Search ............... 222/566, 187, 207, 206, 222/215, 630, 631, 632; 604/77, 73, 217, 296; 239/327, 370, 343

[56] References Cited

U.S. PATENT DOCUMENTS

| 796,129 | 8/1905 | Laughton | 222/187 |
| 3,224,648 | 12/1965 | Zimmermann | 239/327 |
| 3,382,871 | 5/1968 | Parry | 239/327 |
| 3,428,222 | 2/1969 | Wright | 222/187 |

FOREIGN PATENT DOCUMENTS 533098 12/1956 Canada .................................. 222/632

*Primary Examiner*—Joseph J. Rolla
*Assistant Examiner*—Kenneth Noland
*Attorney, Agent, or Firm*—Christie, Parker & Hale

[57] ABSTRACT

Extended surface apparatus contained within a vessel for dispensing a liquid and connected to a nozzle assembly fitted to the vessel comprises an array or arrays of spaced apart elements and a communicating device connecting the array or arrays to the nozzle assembly. The elements are adapted to retain a predetermined dose of the liquid using the solid-liquid intermolecular attraction between the liquid and the elements when the elements come into contact with the liquid.

11 Claims, 4 Drawing Sheets

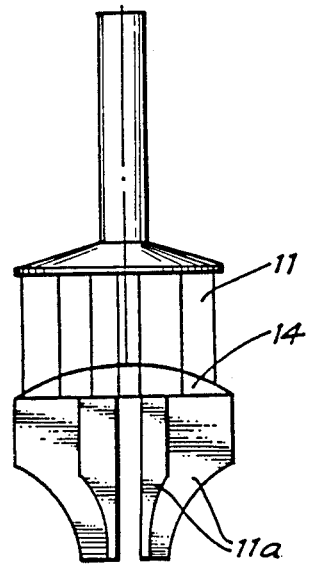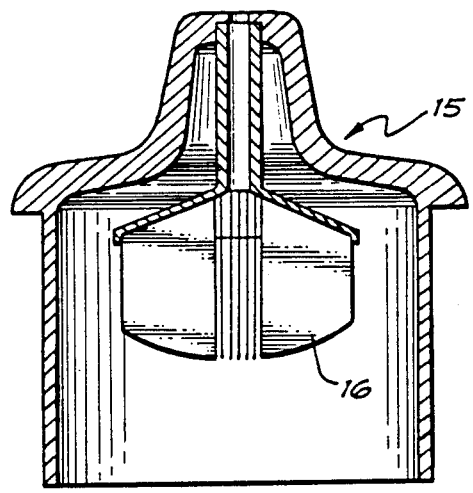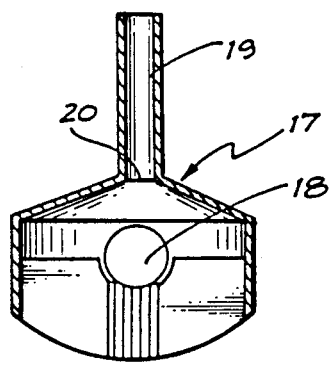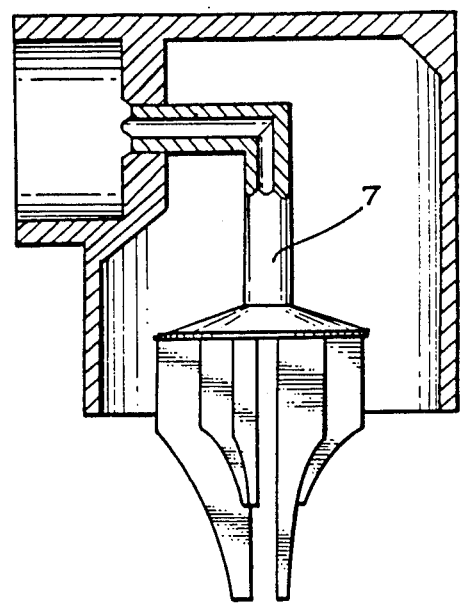

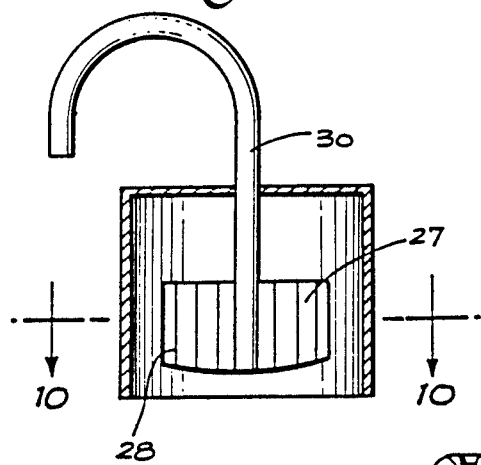
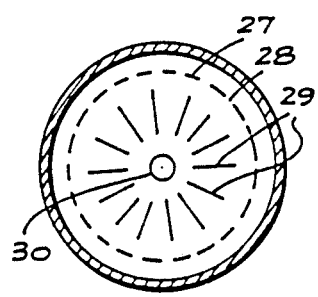
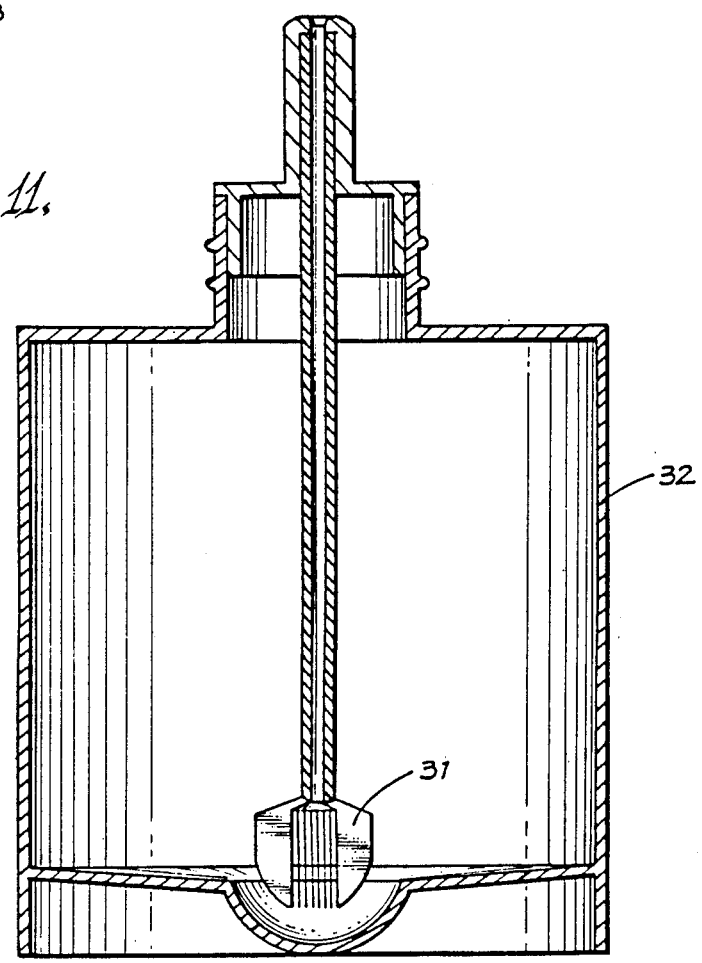

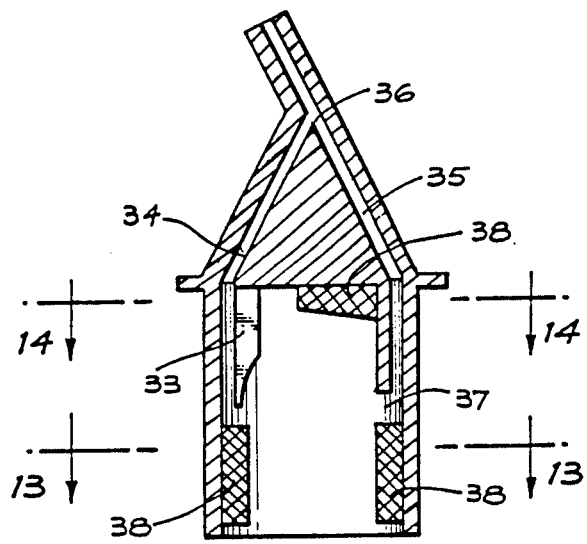
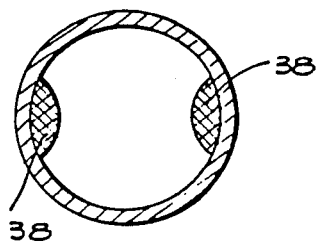 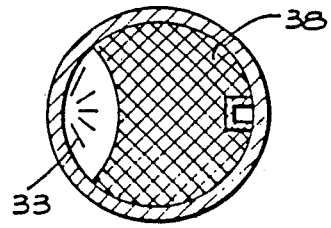

EXTENDED SURFACE APPARATUS FOR USE IN DISPENSING LIQUIDS

The present invention relates to dispensing devices and specifically to such devices which are commonly used to dispense a definite quantity of a liquid such as "eye drop" or "nasal spray".

Hitherto, dispensing devices have been objectionable for a number of reasons. The majority of dispensers comprise a resilient container and nozzle, sometimes with a tube connecting the nozzle with the contents of the container. Upon squeezing the container, maybe after inverting it, and then squeezing it, an indeterminate quantity of the liquid contents is expressed from the container. When the substance is a pharmaceutical composition, it may be undesirable to dispense more or less than a predetermined dose.

It is known to provide a capillary system within the dispensers which, when the dispenser is upturned, absorbs a quantity of the liquid contents to be dispensed. However, known capilliary systems comprise, for example, a piece of bamboo cane which is inherently irregular in nature and not so well adapted to use in the mass production of large numbers of dispensing devices each able to dispense a predetermined quantity of liquid. Also, irregular sized drops of the liquid are able to cling to the bamboo and are dispensed in addition to the predetermined quantity. This affects the accuracy of such dispensers.

Alternative known dispensers comprise a pressurized vessel having a valve through which liquids may be forced in the form of spray by a propellant. Risk is involved in using such dispensers in that propellant such as Freon may enter the human body. Furthermore, such dispensers require a container able to withstand high pressures and a complex valve. These features add to the expense of the dispensers.

It is an object of the present invention to overcome or at least ameliorate the abovementioned shortcomings of the prior art by simple means.

In its broadest form the present invention comprises: an extended surface apparatus adapted to be contained within a vessel for dispensing a liquid, wherein said extended surface apparatus is connected to a nozzle assembly fitted to said vessel;
said extended surface apparatus comprising:
an array or arrays of spaced apart elements and communication means connecting said array or arrays to said nozzle assembly;
said elements being adapted to retain a predetermined dose of the liquid utilising intermolecular attraction between said liquid and said elements after elements come in contact with said liquid.

In a preferred embodiment the extended surface apparatus is made of a plastic material with the vessel being of a resilient plastics material.

The vessel can also be comprised of numerous other resilient materials.

In another embodiment the spaced apart elements can be arranged in a configuration which, during the dispensing of the measured dose of liquid, creates a vortex effect in the liquid as it passes from the elements to the exit of the nozzle via the communication means.

It is an advantage of the present invention over the previously known capillary devices that an accurate dosage of the liquid to be dispensed can be achieved. The present invention does not rely on the capillary effects, and has the advantage that it can be contacted completely with the liquid, as the liquid can charge from many directions with the air easily being replaced by the liquid.

The capillary system adhesive surface tension forces create a reasonably large resistance to the air and liquid stream resulting in the liquid not being completely expressed.

Prefered embodiments of the present invention will now be described by way of non-limiting example only, with reference to the accompanying drawings in which:

FIG. 5 is a side elevation of an extended surface apparatus including an additional drip-plate.

FIG. 6 is a cross-sectional side elevation of a nozzle and extended surface apparatus of a second embodiment of the present invention.

FIG. 7 is a cross-sectional side elevation of an extended surface apparatus of a third embodiment of the present invention.

FIG. 8 is a cross-sectional side elevation of an alternative nozzle and an extended surface apparatus shown in FIG. 1.

FIG. 9 is a cross-sectional side elevation of yet another alternative nozzle and an extended surface apparatus of a further embodiment of the present invention.

FIG. 10 is a cross-sectional view taken on line 10—10 of FIG. 9.

FIG. 11 is a cross-sectional side elevation of a dispenser according to a further embodiment of the present invention.

FIG. 12 is a cross-sectional side elevation of a nozzle and extended surface apparatus of another embodiment of the present invention.

FIG. 13 is a cross-sectional view taken on line 13—13 of FIG. 12, and

FIG. 14 is a cross-sectional view taken on line 14—14 of FIG. 12.

Figure 1:
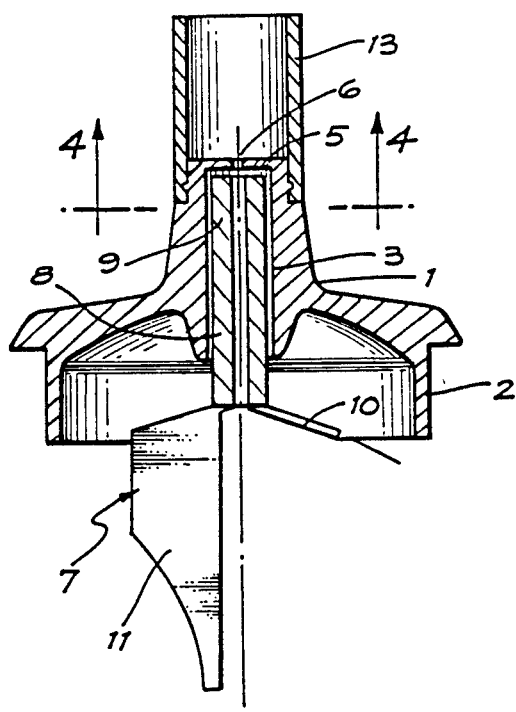
FIG. 1 is a cross-sectional side elevation of the nozzle and extended surface apparatus of a dispensing vessel according to the present invention.

Referring first to FIGS. 1, 2, 3 and 4, a nozzle assembly 1 has a peripheral flange 2 adapted to be fitted within the neck of a dispensing vessel in an air tight manner. Such vessels are well known and are generally manufactured from resilient plastics material. However, they may comprise, for example, a pressurized container.

The nozzle assembly 1 also has a blind bore 3 having a plurality of slots 3. The blind bore 4 terminates in a wall 5 which is pierced by a jet nozzle 6.

An extended surface apparatus 7 comprises a communication means 8 having a first end 9 adapted to be homed within bore 3 and a second end furnished with a flared skirt 10. A plurality of elements 11 are fixedly attached to the lower side of skirt 10, and project downwardly therefrom, when the dispenser is in an upstanding position.

Figure 3:
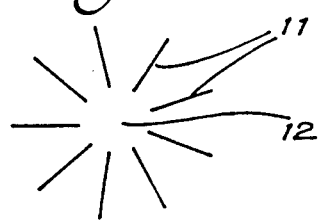
FIG. 3 is a schematic underview of the extended surface apparatus of FIG. 2. showing a configuration of the elements according to one embodiment of the present invention.
Figure 4:
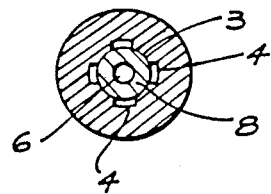
FIG. 4 is a cross-sectional view taken on line 4—4 of FIG. 1.

The elements 11 are arranged in an annular array, as is indicated in FIG. 3. Some of the elements 11 are longer than others and may be of varying widths. The array of elements 11 define a central passage 12. The passage 12 is substantially coaxial with the communicating means 8.

Alternatively, the elements such as those which are shown in FIG. 3 can be configured and arranged in such a way that a vortex can be created during dispensing as the liquid passes along the communication means.

This effect is created by placing the elements radially in groups, with each element curved so as to create a vortex in the liquid as the liquid is imparted from the elements into the central passage 12.

A nozzle extension piece 13 is snap lockingly engageable with the nozzle assembly 3, and is able to be removed from the nozzle assembly for cleaning.

In operation, the vessel is partially filled with the liquid which is to be dispensed for example, a medicament.

The extended surface apparatus 7 of the present invention must be immersed in the liquid such that the elements are submerged. This can be done for example by inverting the dispenser such that the liquid, assisted by gravity, moves towards the nozzle of the dispenser. Immersion of the extended surface elements can also be achieved by shaking the dispenser to an extent that the inertia of the liquid is overcome.

Once the contact takes place between the liquid and the extended surface apparatus 7 of the present invention and in particular with the elements 11 of the said apparatus, the solid-liquid intermolecular attraction takes place with the result that a predetermined dose of the liquid is retained on and between the elements.

The total surface area of the elements comes in contact with the liquid almost at once, thus obviating the need for reliance on any capillary action to achieve the desired result.

The volume of the liquid retained by intermolecular attraction is dependent upon the size, thickness and number of the elements 11 in the array or arrays of elements. It is also dependent upon the spacing and surface area of contact between the liquid and the elements, along with the surface properties of the material used to form the elements with respect to the liquid.

Figure 2:
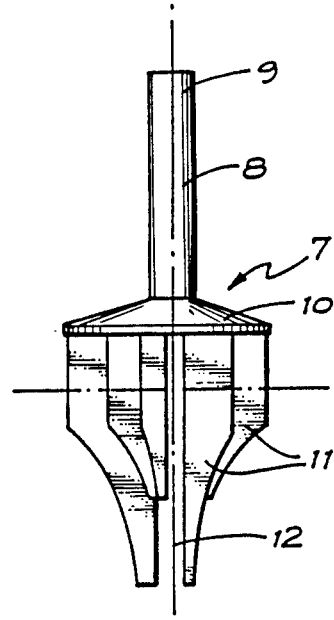
FIG. 2 is a side elevation of the extended surface apparatus shown in FIG. 1.

In the embodiment shown in FIG. 2 the retention of the liquid by the elements is assisted by the skirt 10 due to the intermolecular attraction between the skirt and the liquid.

The dispensing process is activated when the container is squeezed, effectively increasing the pressure within the container. This increase in pressure, which is evenly distributed throughout the inside of the container, forces air across the elements holding the medicament which is then expressed through the communicating means 8 and from jet nozzle 6. Simultaneously, air from within the container is forced through grooves 4 and mixes with the medicament being forced through the communicating means 8, resulting in an aerosol being expressed through jet nozzle 6.

The quantity of medicament to be expressed is dependent upon and can be varied by varying, for instance, the size of the elements, the number of elements in the array, or the thickness of each of the elements.

Elements 11 are shaped as shown in FIG. 2 in order to dislodge an excess drop which may otherwise cling to the lower end of the elements. The longer elements which project beyond the shorter elements effectively provide an area of reduced molecular attraction due to the reduced number and/or greater spacing of the elements and due to their reduced size. If a droplet of medicament of too large a proportion is attached to the elements, the excess will be shed as a result of the abovementioned reduced cohesive forces at the lower end of the extended surface element, thus manifesting a significant advantage over the capillary devices.

Referring now to FIG. 5, an extended surface apparatus similar to that of FIG. 2 is shown, but in this instance the elements 11 support a substantially horizontally extending disk 14 below which hang a number of elements 11_a_.

The purpose of the disk 14 and the elements 11_a_, is to provide an apparatus able to repetitively hold a constant quantity of medicament. If the quantity is too large, a portion of it will overhang the disk 14 and contact one of the lower elements 11_a_ thus isolating it from the medicament to be expressed. Elements 11_a_ can be different in number from elements 11.

Referring now to FIG. 6, an alternate nozzle assembly 15 and alternate extended surface apparatus 16 are shown. The extended surface apparatus 16 operates in a manner similar to that described above but without the elements 11_a_ and also without the grooves to provide the aerosal affect.

FIG. 7 shows another extended surface apparatus 17 similar to that shown in FIG. 6 but including a ball 18 which, when the dispenser is upturned, seals communicating means 19 at 20, preventing medicament from seeping from the dispenser.

It will be appreciated that the dispensers of the prior described embodiments are suitable for dispensing nasal spray. However, nozzle assembly 24 shown in FIG. 8 is adapted for dispensing, for example, inhalant. The dispenser having nozzle assembly 24 operates in the same manner as previously described dispensers. The extended surface apparatus 7 of FIG. 8 is identical to that shown in FIGS. 2.

FIGS. 9 and 10 show yet another nozzle assembly and extended surface apparatus, suitable for dispensing a medicament into another container.

The extended surface apparatus in this case includes an upturned cup-like element 27 having a plurality of slots as is indicated at 28 and containing a radial array or arrays of elements 29. A communicating means 30 has one end disposed within the cup-like element 27, centrally with respect to elements 29. The other end of tube 30 projects from the dispenser.

FIG. 11 shows a dispenser similar in most respects to those above described but adapted to be used in the upturned position.

An extended surface apparatus 31 is, when the vessel is in the upright position, immersed in medicament stored in vessel 32. When the dispenser is upturned, the extended surface apparatus 31 is emerged from the medicament and holds a quantity of the medicament which will be expelled when the dispenser is squeezed.

Referring to FIGS. 12, 13 and 14, a further nozzle assembly is shown comprising an array of elements 33 located adjacent to fluid duct 34. An air duct 35 joins fluid duct 34 at 36 in order to create an aerosol and is open to an access port 37 within the nozzle assembly. Pad elements 38 surround both the elements 33 and the port 37. These elements are adapted to draw away any excess droplets of medicament from the elements and from the passage so that when the dispenser is squeezed only medicament attached to the element is expressed from the nozzle.

Whilst the present invention has been described with reference to a number of examples, it will be appreciated by those skilled in the art that the essence of the present invention is the utilisation of intermolecular attractive forces to separate a predetermined dose of a liquid from a larger charge of liquid for subsequent dispensing of said dose and that this invention can be applied in a multiplicity of apparatuses such as pressure packs for instance, without departing from the spirit and scope of the invention.

I claim:

1. An extended surface apparatus comprising a vessel having liquid and gas therein and for dispensing a liquid wherein said extended surface apparatus is connected to a nozzle assembly fitted to said vessel;

said extended surface apparatus comprising:

an annular array of circumferentially spaced apart elements, and communication means connecting said array of elements with said nozzle assembly, wherein one end of the communication means opens into a central passage defined by said annular array of elements and the other end of said communication means has an annular nozzle which fits within the nozzle assembly of the vessel, and wherein said elements are fixed to a flared skirt projecting from said one end of said communication means;

said elements retain a predetermined dose of the liquid utilizing the solid-liquid intermolecular attraction between said liquid and said elements after said elements come into contact with said liquid.

2. An extended surface apparatus according to claim 1 wherein said elements comprise a plurality of long elements interleaved with shorter elements.

3. An extended surface apparatus according to claim 2 including a radially extending disk supported by said elements, and from which extend a further array of elements.

4. An extended surface element according to claim 3 wherein said elements are radially and curvedly disposed, so as to create a vortex action whilst liquid passes along said communicating means.

5. An extended surface apparatus according to claim 4 wherein said elements are tapered.

6. An extended surface apparatus according to claim 5 including a gravitationally sealed one-way valve controlling flow along said communicating means.

7. An extended surface apparatus according to claim 6 wherein said one-way valve comprises a ball entrapped by said elements, and adapted to seal against one end of said communication means.

8. An extended surface apparatus in combination with a vessel having liquid and gas therein, wherein said extended surface apparatus is connected to a nozzle assembly fitted to said vessel;

said extended surface apparatus comprising:

an array or arrays of spaced apart elements made from a solid material, and communication means connecting said array or arrays to said nozzle assembly;

said elements retaining thereon a predetermined dose of the liquid utilizing the solid-liquid intermolecular attraction between said liquid and solid elements, after said elements come into contact with said liquid, wherein said predetermined dose retained by said elements is proportional to the exposed surface area of each solid element, and wherein the communication means connects the elements of the nozzle assembly so that the quantity of said liquid dispensed through the nozzle assembly is dependent upon said predetermined dose retained on said elements;

in which the communication means comprises an elongated tubular conduit, and in which the solid elements are connected to the tubular conduit so that one end of the conduit opens into a central passage defined by an array of elements and the other end of said communication means has an annular nozzle which fits within the nozzle assembly of the vessel, and in which the opposite ends of the conduit is in gas communication with the nozzle assembly so that the predetermined dose retained on the elements is drawn away from the elements and passes through the conduit to the nozzle assembly for dispensing from the container in response to gas flow passing over the surface of the elements and through the conduit toward the nozzle assembly.

9. An extended surface apparatus according to claim 8 in which the vessel includes elongated slots surrounding the tubular conduit and in gas communication with the nozzle assembly for circulating gas flow toward the nozzle assembly to mix with the predetermined dose being forced through the tubular conduit to produce an aerosol dispensed through the nozzle assembly.

10. An extended surface apparatus to be contained within a vessel for dispensing a liquid wherein said extended surface apparatus is connected to a nozzle assembly fitted to said vessel;

said extended surface apparatus comprising:

an annular array of circumferentially spaced apart elements made from a solid material, and communication means connecting said array of elements with said nozzle assembly, wherein one end of the communication means opens into a central passage defined by said annular array of elements and the other end of said communication means has an annular nozzle which fits within the nozzle assembly of the vessel, and wherein said elements are fixed to a flared skirt projecting from said one end of said communication means;

said elements retaining thereon a predetermined dose of the liquid utilizing the solid-liquid intermolecular attraction between said liquid and said elements after said elements come into contact with said liquid, wherein said predetermined dose retained by said elements is proportional to the exposed surface area of each solid element, and wherein the communication means connects the elements to the nozzle assembly so that the quantity of said liquid dispensed through the nozzle assembly is dependent upon said predetermined dose retained on said elements.

11. An extended surface apparatus in combination with a vessel having liquid and gas therein, wherein said extended surface apparatus is connected to a nozzle assembly fitted to said vessel;

said extended surface apparatus comprising:

an array or arrays of spaced apart elements made from a solid material, and communication means connecting said array or arrays to said nozzle assembly;

said elements retaining thereon a predetermined dose of the liquid utilizing the solid-liquid intermolecular attraction between said liquid and solid elements, after said elements come into contact with said liquid, wherein said predetermined dose retained by said elements is proportional to the exposed surface area of each solid element, and wherein the communication means connects the elements to the nozzle assembly so that the quantity of said liquid dispensed through the nozzle assembly is dependent upon said predetermined dose retained on said elements;

in which the communication means comprises an elongated conduit made from a solid material and having one end connected to the array of elements and communicating with a passage between said elements and the other end of said communication means has an annular nozzle which fits within the nozzle assembly of the vessel, and in which an opposite end of the conduit is in gas communication with the nozzle assembly so that said predetermined dose retained by said elements can be drawn from said elements and pass through the conduit to the nozzle assembly for dispensing from said container.

* * * * *

UNITED STATES PATENT AND TRADEMARK OFFICE
CERTIFICATE OF CORRECTION

PATENT NO. : 4,750,650
DATED : June 14, 1988
INVENTOR(S) : Carl P.C. Ling

It is certified that error appears in the above-identified patent and that said Letters Patent is hereby corrected as shown below:

In the Claims:

Column 5 Line 11    After "dispensing" change "a" to -- the --

Column 5 Line 67    After "elements" change "of" to -- to --

Signed and Sealed this

Eighth Day of August, 1989

Attest:

DONALD J. QUIGG

Attesting Officer

Commissioner of Patents and Trademarks